(12) United States Patent
Jeong et al.

(10) Patent No.: US 11,500,116 B2
(45) Date of Patent: Nov. 15, 2022

(54) IDENTIFYING CHARACTERISTICS OF A SUBTERRANEAN REGION USING VECTOR-BASED WAVEFIELD SEPARATION OF SEISMIC DATA FROM THE SUBTERRANEAN REGION

(71) Applicant: Saudi Arabian Oil Company, Dhahran (SA)

(72) Inventors: Woodon Jeong, Dhahran (SA); Constantinos Tsingas, Dhahran (SA); Young Seo Kim, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 589 days.

(21) Appl. No.: 16/413,240

(22) Filed: May 15, 2019

(65) Prior Publication Data
US 2020/0363548 A1 Nov. 19, 2020

(51) Int. Cl.
*G01V 1/30* (2006.01)
*G01V 1/18* (2006.01)

(52) U.S. Cl.
CPC .............. *G01V 1/306* (2013.01); *G01V 1/181* (2013.01); *G01V 1/303* (2013.01);
(Continued)

(58) Field of Classification Search
CPC ........ G01V 1/306; G01V 1/181; G01V 1/303; G01V 2210/41; G01V 2210/57; G01V 2210/6222; G01V 2210/675
See application file for complete search history.

(56) References Cited

U.S. PATENT DOCUMENTS 8,756,042 B2 * 6/2014 Tan ................. G01V 1/005
703/10
9,753,166 B2 9/2017 Bale
(Continued)

FOREIGN PATENT DOCUMENTS

CN 107894613 4/2018

OTHER PUBLICATIONS

Dellinger and Etgen, "Wave-field separation in two-dimensional anisotropic media," Geophysics, vol. 55, No. 7, Jul. 1990, 6 pages.
(Continued)

*Primary Examiner* — Elias Desta
(74) *Attorney, Agent, or Firm* — Fish & Richardson P.C.

(57) ABSTRACT

Methods and systems, including computer programs encoded on a computer storage medium can be used for identifying primary-wave (P-wave) and secondary-wave (S-wave) characteristics of an underground formation by separating P-wave and S-wave modes of seismic data generated by applying a seismic source to a subterranean region of a geological area. Particle motion vectors of a P-wave are parallel to a propagation vector of the P-wave, whereas particle motion vectors of an S-wave are perpendicular to a propagation vector of the S-wave. The parallel and perpendicular relationship between the motion and propagation vectors of the respective P- and S-waves provide a basis for separating P- and S-wave components from a wavefield. The separation methodology extracts P-wave components and S-wave components from the wavefield based on an estimated angle between propagation vectors and wave motion vectors for the wavefield.

21 Claims, 13 Drawing Sheets

(52) U.S. Cl.
CPC ...... *G01V 2210/41* (2013.01); *G01V 2210/57* (2013.01); *G01V 2210/6222* (2013.01); *G01V 2210/675* (2013.01)

(56) References Cited

U.S. PATENT DOCUMENTS

| | | | |
|---|---|---|---|
| 9,791,580 | B2 | 10/2017 | Asgedom et al. |
| 9,921,325 | B2 | 3/2018 | Hegna et al. |
| 10,379,245 | B2* | 8/2019 | Pan ............ G01V 1/325 |
| 10,712,461 | B2* | 7/2020 | Lu ............. G01V 1/362 |
| 2017/0013420 | A1 | 5/2017 | Lu et al. |
| 2019/0011585 | A1 | 1/2019 | Sun et al. |

OTHER PUBLICATIONS

Cerveny, "Seismic ray theory," Cambridge University Press, Apr. 2000, 742 pages.

Sun et al., "Separating P- and S-waves in prestack 3D elastic seismograms using divergence and curl," Geophysics vol. 69, No. 1, Jan.-Feb. 2004, 12 pages.

Wang et al., "Comparison of two algorithms for isotropic elastic P and S vector decomposition," Geophysics, vol. 80, No. 4, Jul.-Aug. 2015, 15 pages.

Xiao and Leaney, "Local vertical seismic profiling (VSP) elastic reverse-time migration and migration resolution: Salt-flank imaging with transmitted P-to-S waves," Geophysics vol. 75, No. 2, Mar.-Apr. 2010, 15 pages.

Yan and Dickens, "Reverse time migration angle gathers using Poynting vectors," Geophysics vol. 81, No. 6, Nov.-Dec. 2016, 12 pages.

Zhang and McMechan, "2D and 3D elastic wavefield vector decomposition in the wavenumber domain for VTI media," Geophysics vol. 75, No. 3, May-Jun. 2010, 14 pages.

GCC Examination Report issued in Gulf Cooperation Council Appln. No. 2020-39753, dated Aug. 23, 2021, 5 pages.

PCT International Search Report and Written Opinion in International Appln. No. PCT/US2020/032826, dated Aug. 17, 2020, 47 pages.

GCC Examination Report issued in Gulf Cooperation Council Appln. No. 2020-39753, dated Dec. 27, 2021, 5 pages.

\* cited by examiner

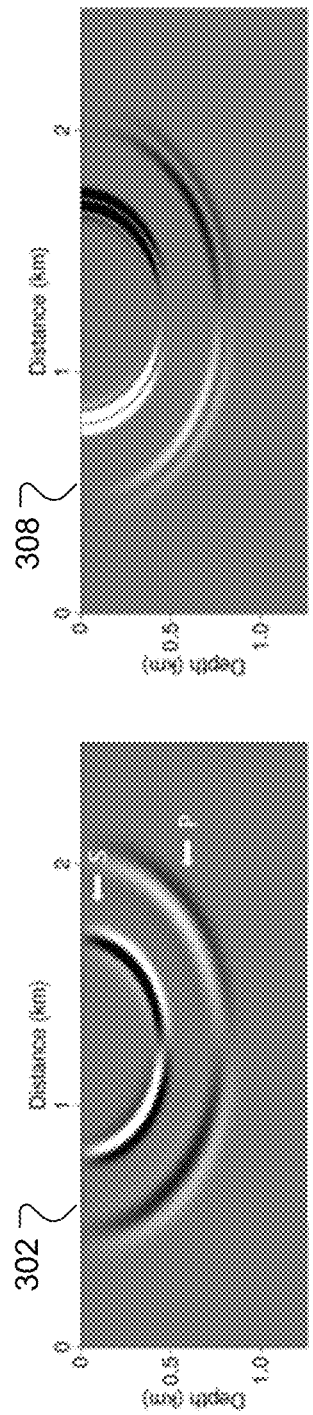
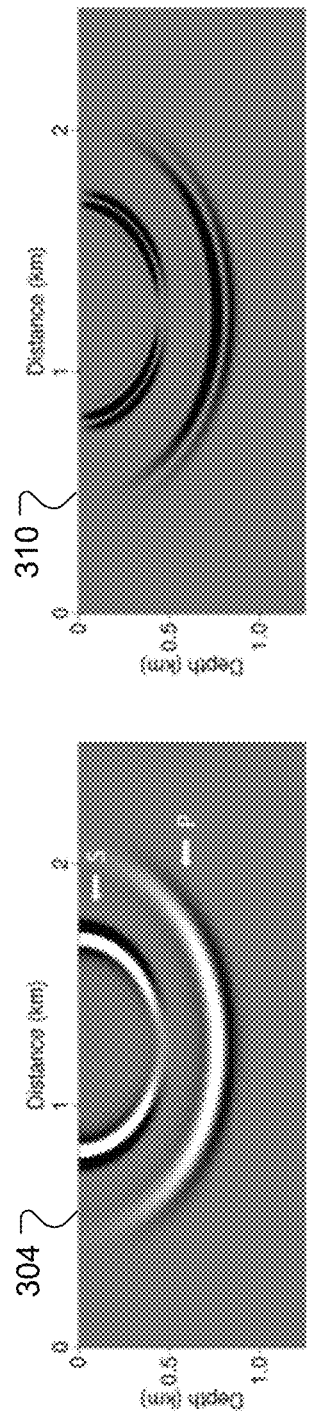
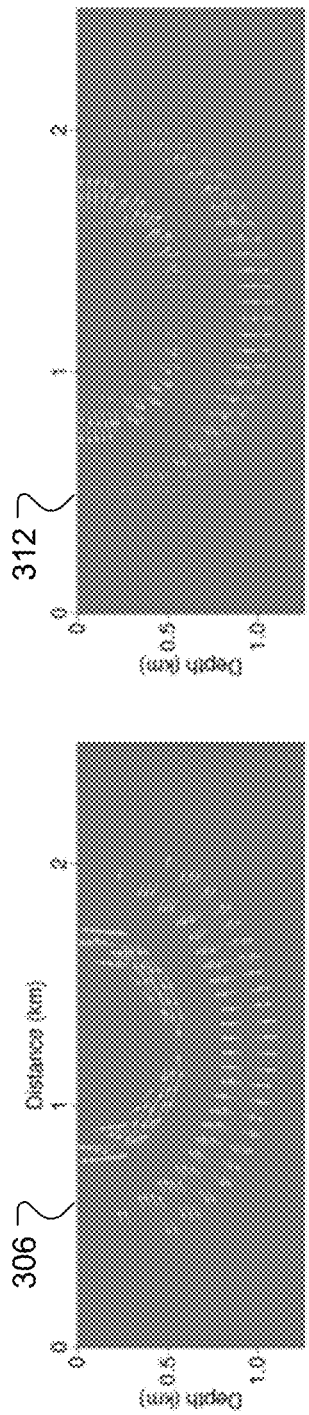
Fig. 5A  Fig. 5C  Fig. 5E
Fig. 5B  Fig. 5D  Fig. 5F

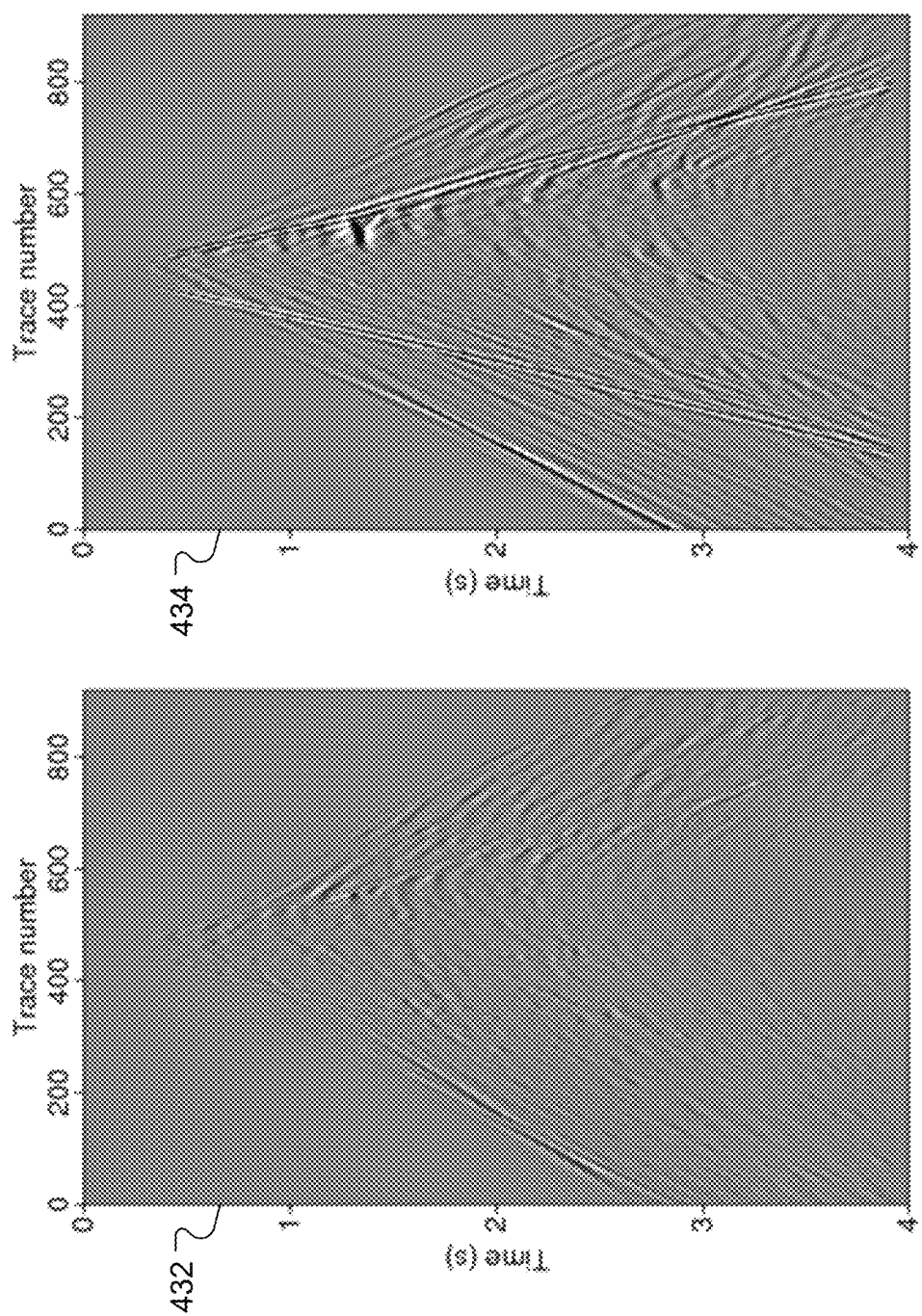

IDENTIFYING CHARACTERISTICS OF A SUBTERRANEAN REGION USING VECTOR-BASED WAVEFIELD SEPARATION OF SEISMIC DATA FROM THE SUBTERRANEAN REGION

TECHNICAL FIELD

This specification relates to identifying characteristics of a subterranean region based on seismic data for the subterranean region.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis is a subdivision of seismic stratigraphy and plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as identification of potential petroleum reservoirs. Seismic surveys are conducted by using a controlled seismic source (for example, a seismic vibrator or dynamite) to create a seismic wave. In land-based seismic surveys, the seismic source is typically located at ground surface. The seismic wave travels into the ground, is reflected by subsurface formations, and returns to the surface where it is recorded by sensors called geophones. The data generated by output signals of the sensors can describe various components of a multi-component wavefield. For example, the components of the wavefield can be associated with P-wave and S-wave modes of seismic data generated based on a seismic wave created by the seismic source. As described in more detail later, P-waves are compressional waves that are longitudinal in nature, whereas S-waves are shear waves that are transversal in nature.

SUMMARY

P- and S-wave mode separation methodologies for pre-stack seismic data are useful when processing seismic data components to identify, develop, or produce resources such as oil and gas from a subterranean formation. Accordingly, this document describes techniques for improved separation of elastic multi-component wavefields such that P- and S-wave components of a wavefield can be extracted and processed separately as either pure P-wave mode data or pure S-wave mode data. This separate processing of respective P-wave and S-wave data can translate to improved detection of oil and gas resources.

The described techniques provide a methodology for P- and S-wave mode separation using wave propagation vectors and wave motion vectors of a wavefield represented by the seismic data generated from the geophone sensors. For example, particle motion vectors of respective P-waves and S-waves correspond to energy flow of a wavefield. Particle motion vectors (vx, yz) of a P-wave are parallel to a propagation vector (mx, mz) of the S-wave, whereas particle motion vectors of an S-wave are perpendicular to a propagation vector of the P-wave. The parallel and perpendicular relationship between the motion and propagation vectors of the respective P- and S-waves provide a basis for separating P- and S-wave components from a wavefield. For example, the separation methodology extracts P-wave components and S-wave components from the wavefield based on an estimated angle between propagation vectors and wave motion vectors for the wavefield.

One aspect of the subject matter described in this specification can be embodied in a computer-implemented method for identifying primary-wave (P-wave) and secondary-wave (S-wave) characteristics of an underground formation by separating P-wave and S-wave modes of seismic data generated by applying a seismic source to a subterranean region of a geological area. The method includes obtaining a wavefield comprising longitudinal and transverse particle velocity components observed by geophones deployed in the subterranean region. Stress components for each of the P-wave and the S-wave modes of seismic data associated with the subterranean region are calculated using a wavefield extrapolation engine.

The method further includes computing propagation vectors for the wavefield based on the longitudinal and transverse particle velocity components and the stress components for each of the P-wave and the S-wave modes of seismic data using the wavefield extrapolation engine. An angle between the computed propagation vectors for the wavefield and wave motion vectors observed in the wavefield is estimated. The method also includes extracting P-wave components of the wavefield based at least in part on the angle between the propagation vectors and the wave motion vectors using a wavefield separation engine; and extracting S-wave components of the wavefield based at least in part on the angle between the propagation vectors and the wave motion vectors using the wavefield separation engine.

These and other implementations can each optionally include one or more of the following features. For example, in some implementations obtaining the wavefield comprising longitudinal and transverse particle velocity components comprises applying the seismic source to the subterranean region and detecting a seismic wave that occurs in response to the seismic source being applied to the subterranean region. Detecting the seismic wave can include measuring longitudinal and transverse particle velocity components using one or more geophones in the subterranean region.

In some implementations, the method further includes: extracting the longitudinal and transverse particle velocity components of the wavefield from information in the seismic data that corresponds to a measured energy flux of the wavefield. Calculating stress components for each of the P-wave and the S-wave modes of seismic data can include calculating the stress components using wavefield extrapolation such that the stress components are calculated without direct manipulation of the wavefield.

In some implementations, computing propagation vectors for the wavefield comprises: computing Poynting vectors of the wavefield based on a first-order elastic wavefield equation that uses the longitudinal or transverse particle velocity components as a first input variable and the P-wave or S-wave mode stress components as a second input variable.

Computing propagation vectors for the wavefield can include: computing propagation vectors for the P-wave mode of seismic data based on Poynting vectors of the wavefield that are computed for the P-wave mode; and computing propagation vectors for the S-wave mode of seismic data based on Poynting vectors of the wavefield that are computed for the S-wave mode. The computed Poynting vectors are descriptive of an energy flux of the wavefield from which the longitudinal and transverse particle velocity components are extracted.

In some implementations, estimating the angle between the computed propagation vectors for the wavefield and wave motion vectors observed in the wavefield comprises: estimating the angle in response to generating a least-squares solution for a given time window. Extracting the P-wave components of the wavefield can include extracting the P-wave components of the wavefield using an angle-based weighting function that is applied to the angle between the computed propagation vectors for the wavefield and wave motion vectors observed in the wavefield. Extracting the S-wave components of the wavefield can include extracting the S-wave components of the wavefield in response to subtracting the P-wave components of the wavefield.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that are executable by a data processing apparatus to cause the apparatus to perform the actions.

The subject matter described in this specification can be implemented to realize one or more of the following advantages. The described techniques provide improved separation of elastic multi-component wavefields relative to conventional methods for separating P- and S-wave components of a wavefield.

Conventional separation approaches employ divergence and curl operators as well as auxiliary parameters that manipulate the wavefields and distort the seismic data obtained for a subterranean region. Unlike these conventional approaches the separation methodology described in this document does not require divergence and curl operators and auxiliary parameters that can manipulate the wavefield or distort the seismic data.

Rather, the described methods use the propagation and motion vectors of the P- and S-waves to extract P- and S-wave components of the wavefield based at least in part on an angle between the propagation vectors and the wave motion vectors of the wavefield. In this manner, P- and S-wave components of the wavefield can be extracted and processed separately as either pure P-wave mode data or pure S-wave mode data. This separate processing of respective P-wave and S-wave data can translate to improved detection of oil and gas resources for a given subterranean region.

In some implementations, separate processing of respective P-wave and S-wave modes of seismic data provides an element of de-noising for removing noise components in seismic data to obtain pure P-wave data and pure S-wave data and to achieve signal enhancement for mode-separation. In addition, the separated P-wave and S-wave modes of seismic data can be useful for improving processes associated with seismic depth imaging (reverse time migration) and velocity model building (full waveform inversion).

The details of one or more embodiments of these systems and methods are set forth in the accompanying drawings and the description to be presented. Other features, objects, and advantages of these systems and methods will be apparent from the description and drawings, and from the claims.

BRIEF DESCRIPTION OF THE DRAWINGS

FIGS. 5A-5F illustrate example wavefield characteristics in seismic data for a subterranean region.

FIGS. 6A-6J illustrate various elements that represent wavefield characteristics in seismic data for a subterranean region.

Like reference numbers and designations in the various drawings indicate like elements.

DETAILED DESCRIPTION

This specification describes P- and S-wave mode separation methodologies for processing pre-stack seismic data to identify, develop, or produce resources such as oil and gas from a subterranean formation. The described techniques provide improved separation of elastic multi-component wavefields such that P- and S-wave components of a wavefield can be extracted and processed separately as either pure P-wave mode data or pure S-wave mode data. This separate processing of respective P-wave and S-wave data can translate to improved detection of oil and gas resources.

Figure 1:
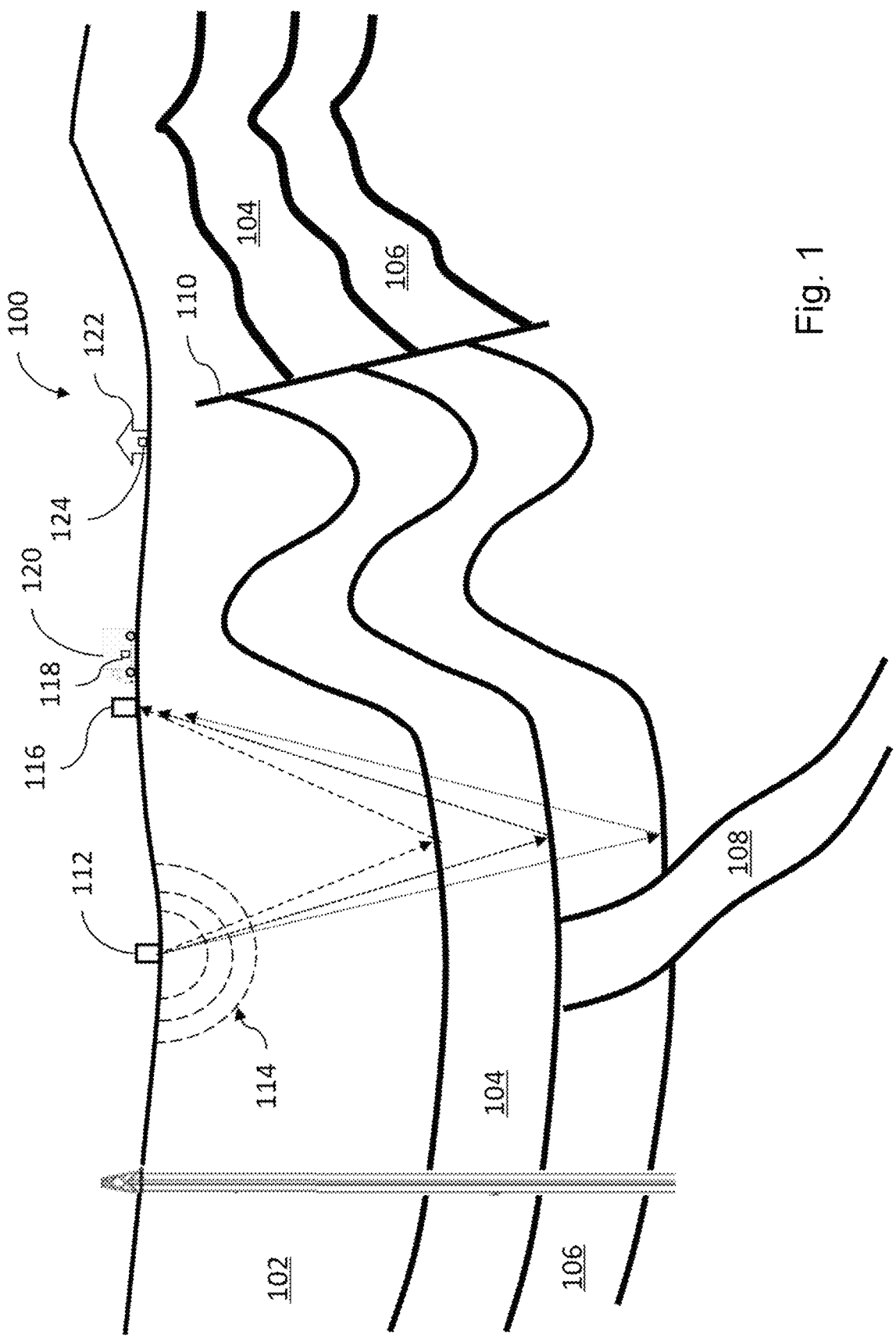
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Subterranean features can be mapped using seismic data that represents elastic multi-component wavefields. In performing seismic surveys, elastic waves are generated by the seismic survey equipment whose reflections/refractions are received by sensor devices or geophones. Such elastic waves include primary waves (P-waves) and secondary waves (S-waves). As described earlier, P-waves are compressional waves that are longitudinal in nature, whereas S-waves are shear waves that are transversal in nature. P- and S-wave components of a wavefield can be extracted and processed separately as either pure P-wave mode data or pure S-wave mode data using the separation methodology described later in this document.

A seismic source 112 (for example, a seismic vibrator or an explosion) generates seismic waves 114 that propagate in the earth. The velocity of these seismic waves depends on properties that include density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, such as a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location other than the control center 122. Some computer systems are provided with functionality for manipulating and analyzing the data, such as performing seismic interpretation or borehole resistivity image log interpretation, to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing represent the subterranean formation 100. The seismic cube can also display results of the analysis of the seismic data associated with the seismic survey.

Figure 2:
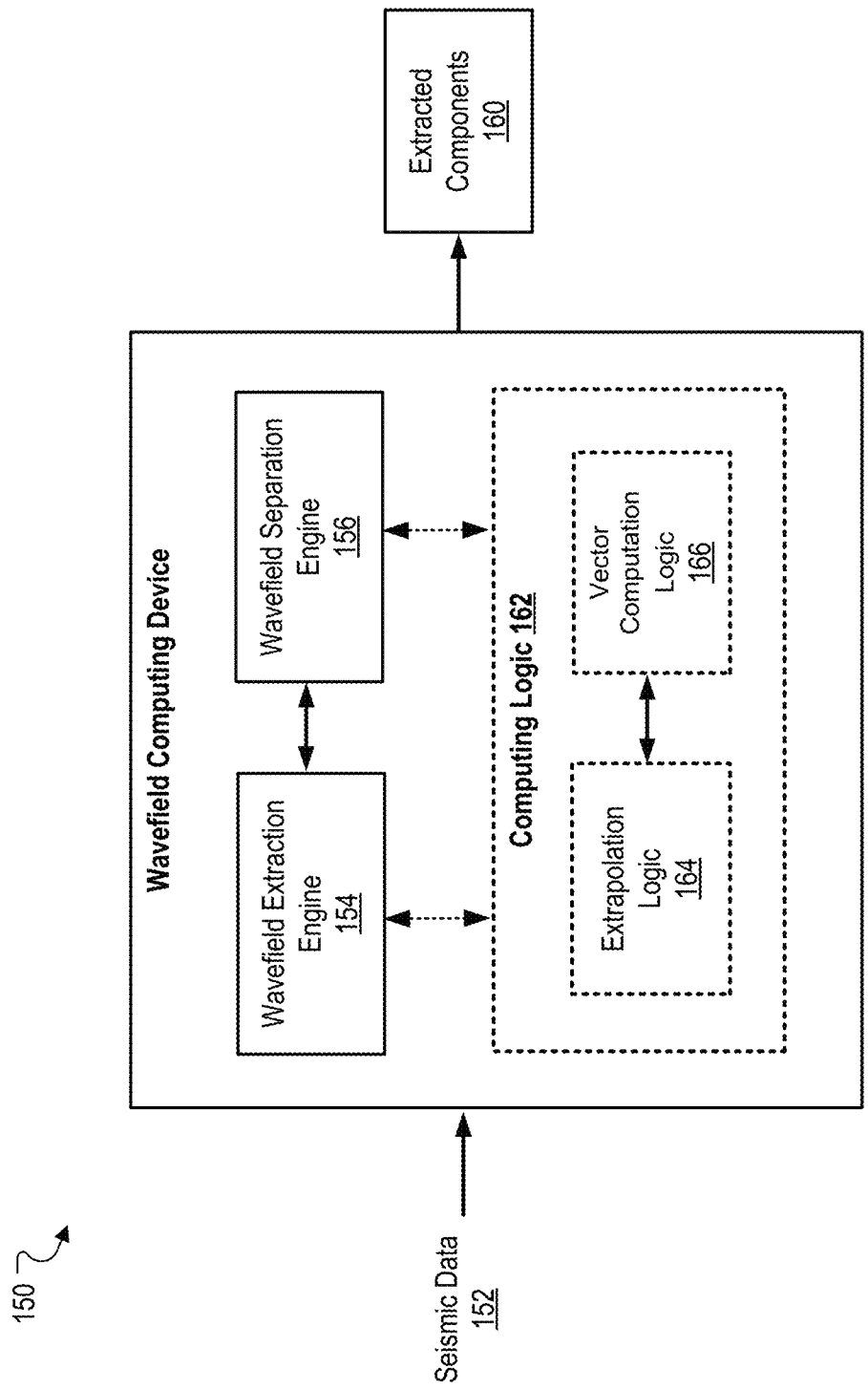
FIG. 2 illustrates an example computing system used to perform vector-based wavefield separation.

FIG. 2 illustrates an example computing device 150 used to perform vector-based wavefield separation. In some implementations, computing device 150 is included in the computer system 124 described earlier with reference to FIG. 1. For example, the computing device 150 is included in the computer system 124 as a sub-system of hardware circuits, such as a special-purpose circuit, that includes one or more processor microchips. In general, computing device 150 can include processors, for example, a central processing unit (CPU) and a graphical processing unit (GPU), memory, and data storage devices that collectively form one or more computing devices 150 of computer systems 124.

Computing device 150 includes a wavefield extraction engine 154 and a wavefield separation engine 156 that cooperate to generate extracted components 160. The computing device 150 can receive a set of seismic data 152 and process the received seismic data using engines 154 and 156 to generate the extracted components 160.

The seismic data 152 can include and represent a wavefield that is observed by geophones deployed in a subterranean region. The seismic data 152 can include data or other information representing P-wave and S-wave characteristics of an underground formation. For example, the seismic data 152 is generated by applying a seismic source to a subterranean region of a geological area that includes the underground formation. In some implementations, the seismic source is applied by generating seismic energy waves that propagate in the subterranean region. The seismic waves reflect some of the energy of the wave and the reflected energy is detected by one or multiple sensors such as geophone-receivers. The geophone-receivers generate electrical output signals in response to received seismic energy waves, including energy waves reflected by horizons in the subterranean region. The output signals can be transmitted as the seismic data 152 that is received as an input to computing device 150. In some cases, the output signals are processed locally. In other cases, the output signals are stored as part of a larger set of output data related to the subterranean region before being processed by the computing device 150.

The computing device 150 is used to identify P-wave and S-wave modes of the seismic data 152 and to extract respective P-wave components and S-wave components. The wavefield extraction engine 154 accesses computing logic 162 of computing device 150 to perform calculations for obtaining or extracting certain wavefield components of a wavefield represented by the seismic data 152. For example, the wavefield extraction engine 154 uses extrapolation logic 164 to obtain stress and particle velocity components of the wavefield.

Similarly, the wavefield separation engine 156 accesses the computing logic 162 to compute certain vector elements of the wavefield represented by the seismic data 152. For example, the wavefield separation engine 156 uses vector computation logic 166 to compute propagation vectors based on the obtained stress and particle velocity components of the wavefield. The wavefield separation engine 156 can also identify wave motion vectors that are observable in the wavefield based on energy flow characteristics of the wavefield.

The computing device 150 determines an angle between the propagation vectors and wave motion vectors and uses the determined angle to generate extracted components 160. In some implementations, the extracted components 160 correspond to an example data structure that includes information and data values for the respective extracted P-wave components and S-wave components.

Figure 3A:
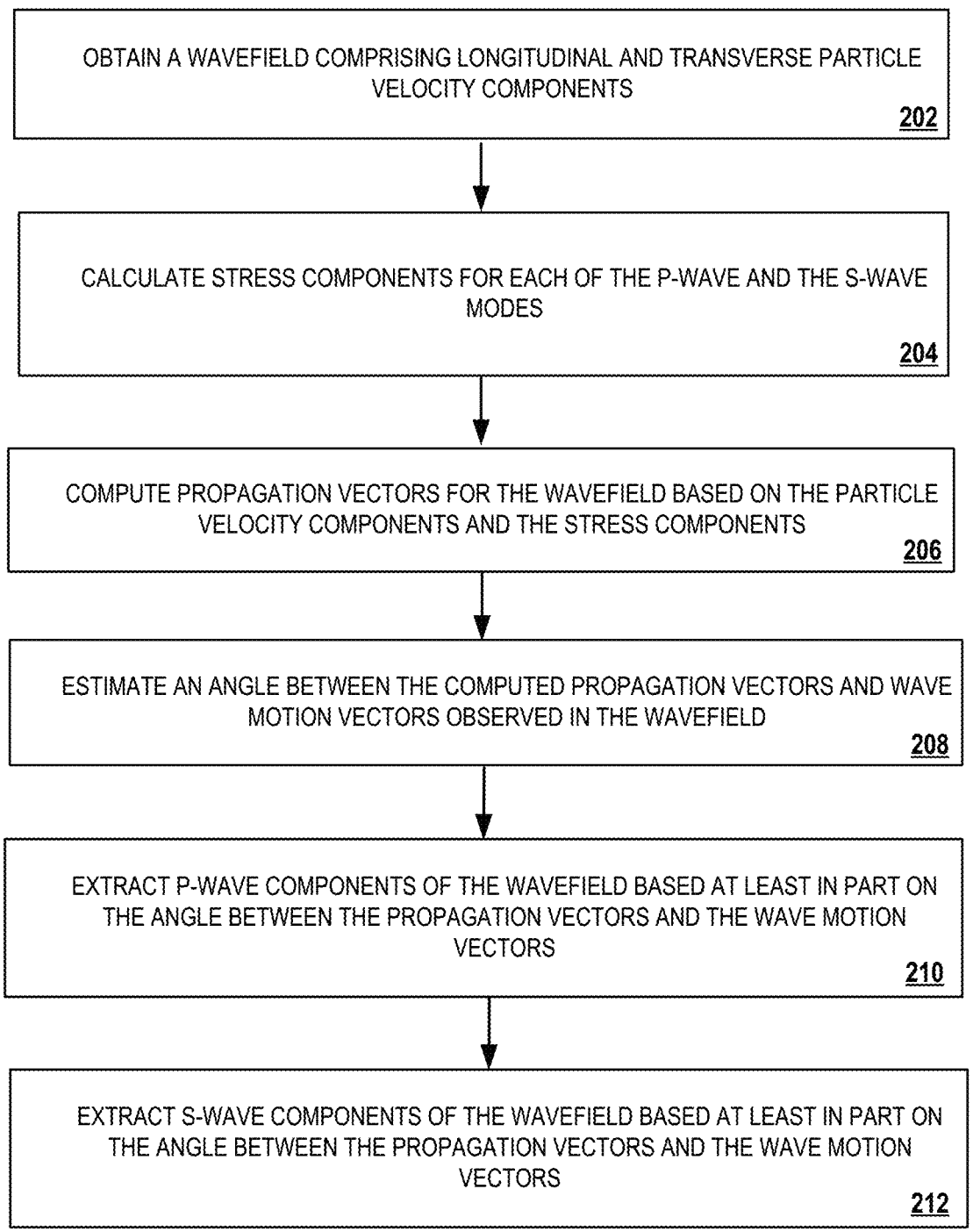
FIGS. 3A-3B are flow diagrams of example processes for using vector-based elastic wavefield separation to identify wavefield characteristics in seismic data for a subterranean region.
Figure 3B:
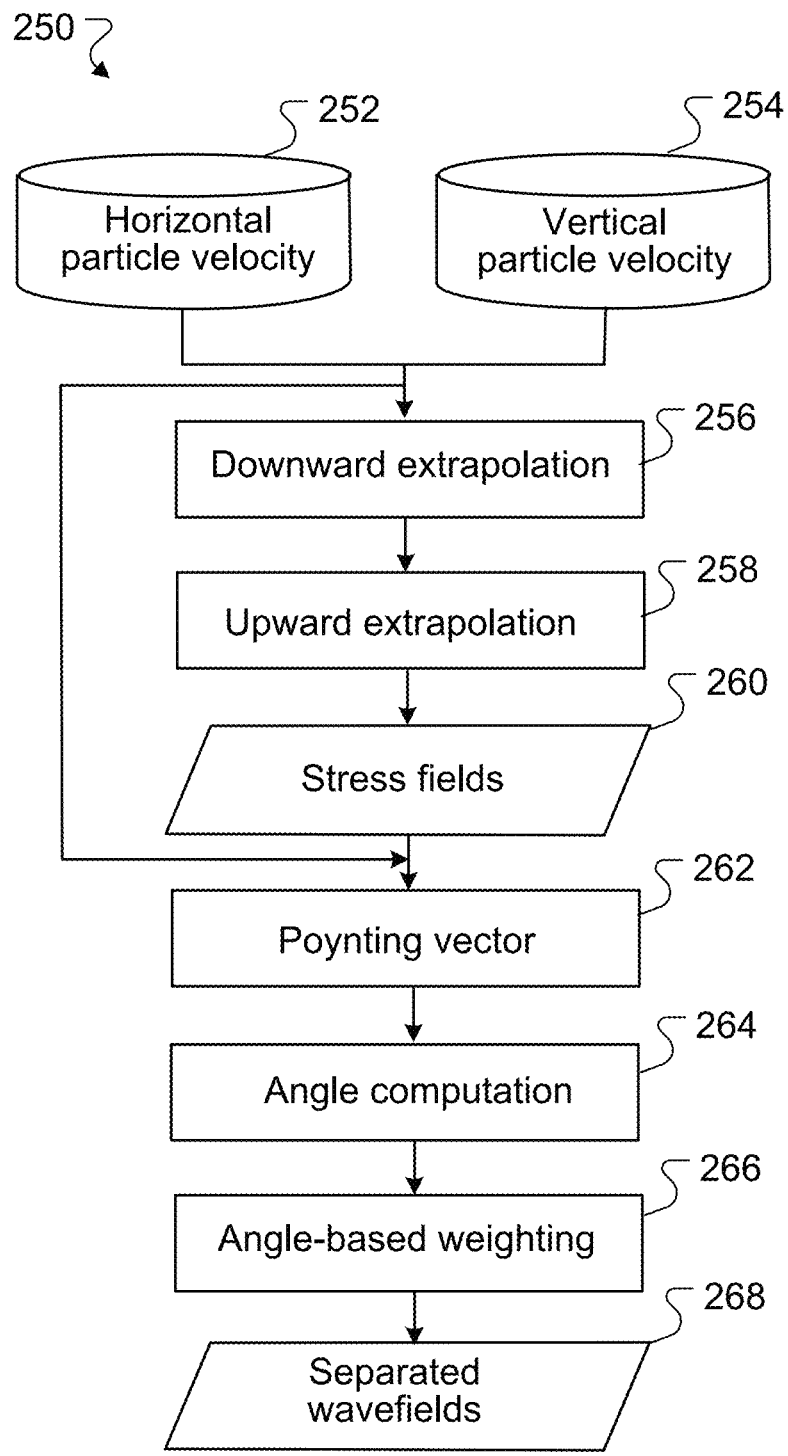

FIGS. 3A-3B are flow diagrams of example processes for using wavefield separation to identify wavefield characteristics in seismic data for a subterranean region. In particular, FIG. 3A is an example process 200 for using vector-based elastic wavefield separation to separate P-wave and S-wave modes of seismic data generated by applying a seismic source to a subterranean region. Process 200 can be implemented using one or more computing elements of computer systems 124 described earlier as well as other devices and modules described in this document.

Referring now to process 200, a sensor such as a geophone-receiver obtains a wavefield observed by geophone-receivers deployed in a subterranean region (202). The wavefield can be an elastic multi-component wavefield that is represented by seismic data generated from output signals of the geophone-receivers. The seismic data can describe various components of the multi-component wavefield. For example, the wavefield includes P-wave components and S-wave components and other components of the wavefield can be associated with P-wave and S-wave modes of seismic data generated based on the seismic source.

A P-wave corresponds to an elastic body wave or sound wave in which wave particles oscillate in a direction that the wave propagates. P-waves that contact an interface can produce reflected and transmitted S-waves. An S-wave corresponds to an elastic body wave in which particles oscillate perpendicular to the direction in which the wave propagates. S-waves are also known as shear waves and can travel slower than P-waves.

The computer systems 124 calculates stress components for each of the P-wave and the S-wave modes of seismic data associated with the subterranean region (204). The computing device 150 of computer systems 124 calculates the stress components for each of the P-wave and the S-wave modes using the wavefield extrapolation engine 154. For example, the wavefield extraction engine 154 uses a first-order elastic wave equation specified by extrapolation logic 164 to calculate the stress components of the wavefield.

In some implementations, extrapolation logic 164 is used to obtain stress components of the wavefield without direct modification or manipulation of the wavefield. For example, extrapolation logic 164 can be used to calculate the stress components without requiring the divergence, curl operators, or auxiliary parameters typically employed by conventional approaches that manipulate the wavefield or distort the seismic data.

As described earlier, P-waves are longitudinal in nature whereas S-waves are transversal in nature. The wavefield obtained by the sensor can include longitudinal and transverse particle velocity components that are associated with the P-waves and S-waves, respectively. In some implementations, obtaining or detecting the seismic wavefield includes measuring longitudinal and transverse particle velocity components using at least one geophone-receiver in the subterranean region.

As described in more detail later, the propagation vector can be computed from the given multi-component seismic data. The computing device 150 computes propagation vectors for the wavefield based on the longitudinal and transverse particle velocity components and the stress components (206). For example, the propagation vectors are computed based on the particle velocity components and the stress components for each of the P-wave and the S-wave modes of seismic data using the wavefield extrapolation engine 154, the wavefield separation engine 156, or both.

The wavefield separation engine 156 uses vector computation logic 166 to compute propagation vectors based on the obtained stress and particle velocity components of the wavefield. In some implementations, vector computation logic 166 specifies computing instructions associated with a Poynting vector theory for computing an energy flux of the wavefield. For example, a Poynting vector is employed by at least the wavefield separation engine 156 to obtain a direction of wave propagation, which corresponds to the propagation vector. The stress components of the wavefield are elements of the Poynting vector calculation that is used to obtain the propagation vectors.

As described in more detail later, the computing device 150 computes propagation vectors for the P-wave mode of seismic data based on Poynting vectors of the wavefield that are computed for the P-wave mode. Likewise, the computing device 150 computes propagation vectors for the S-wave mode of seismic data based on the Poynting vectors of the wavefield that are computed for the S-wave mode.

The computing device 150 estimates an angle between the computed propagation vectors for the wavefield and wave motion vectors observed in the wavefield (208). The P- and S-wave motion vectors may be observed in an elastic multi-component wavefield and is given from the multi-component seismic data. For example, the wavefield separation engine 156 can be used to identify wave motion vectors that are observable in the wavefield based on energy flow characteristics of the wavefield.

The angle between the wave motion vectors and the propagation vectors is estimated or computed to distinguish each wave mode component for extracting the P- and S-wave components. To improve stability of the angle estimation, the angle is estimated through solving a least squares problem within a short period time window. In some implementations, a filtering is performed based on the estimated angle to obtain the final products that correspond to a P-wavefield detected at a longitudinal component geophone and to an S-wavefield detected at a horizontal component geophone.

The obtained elastic multi-component wavefield includes vector wavefields acquired by longitudinal (vertical) and transverse (horizontal) component geophones. Although each wavefield includes both P- and S- wave modes, the longitudinal component data is often described as a P-wavefield, whereas the transverse component data is often described as an S-wavefield. In this manner, S-wave mode components that are included in the longitudinal P-wave component data are indicated or shown as noise and, conversely, P-wave mode components that are included in the transverse S-wave component data are indicated or shown as noise. Thus, separating each wavemode, for example, at a pre-stack seismic processing level, provides an element of de-noising that allows for improved processing of the vertical and horizontal component data as pure P- and S-wave mode data.

The computing device 150 extracts P-wave components of the wavefield based at least in part on the angle between the propagation vectors and the wave motion vectors using the wavefield separation engine 156 (210). The computing device 150 extracts S-wave components of the wavefield based at least in part on the angle between the propagation vectors and the wave motion vectors using the wavefield separation engine 156 (212).

FIG. 3B is an example process 250 for obtaining certain wavefield characteristics in the seismic data to separate or extract P-wave and S-wave components from the wavefield. Process 250 can also be implemented using one or more computing elements of computer systems 124 described earlier as well as other devices and modules described in this document.

Referring now to process 250, longitudinal particle velocity components (252) and transverse particle velocity components (254) are measured or obtained using at least one geophone-receiver in the subterranean region. Downward wavefield extrapolation (256) is performed, for example, using extrapolation logic 164. In some implementations, data for the downward wavefield extrapolation is recorded for a virtual receiver. This virtual receiver is described in more detail later with reference to FIG. 4. Upward wavefield extrapolation (258) is performed to calculate the corresponding stress fields (260) from the upward extrapolated data. During downward and upward wavefield extrapolation the wavefield extraction engine 154 uses a first-order elastic wave equation specified by extrapolation logic 164 to calculate the stress components of the wavefield.

The particle velocity components of the wavefield and the stress components of the wavefield are solutions of first-order wave equation modeling that is performed, for example, using the computing device 150. For elastic isotropic media the first order two-dimensional elastic wave equations in a stress-velocity formulation are written as: $D_t v_x = b(D_x \tau_{xx} + D_z \tau_{xz})$, $D_t v_z = b(D_x \tau_{xz} + D_z \tau_{zz})$, for the particle velocity components, and $D_t \tau_{xx} = (\lambda + 2\mu) D_x v_x + \lambda D_z v_z$, $D_t \tau_{zz} = (\lambda + 2\mu) D_z v_z + D_x v_x$, $D_t \tau_{xz} = \mu(D_x v_x + D_z v_z)$, for the corresponding stress components. For these expressions $D_i = \partial / \partial i$ ($i \in \{x,z,t\}$), b is the buoyancy, which is the inverse of the density, $\lambda$ and $\mu$ indicate Lamé coefficients, and $\tau$ and $v$ are stress and particle velocity components, respectively.

Referring briefly to the wave motion vectors of the wavefield, the motion vectors can represent respective energy flow of the P- and S-wavefields. The multi-component seismic data that is received as input data by computing device 150 includes the longitudinal and transverse geophone components and each component corresponds to an element of the wave motion vector as indicated by equation (1):

$$V(x, t) = (V_x(x, t), V_z(x, t)) \quad (1)$$

V(x, t) of equation (1) denotes the wave motion vector that represents the instantaneous energy flow of the wavefield. In addition, the wave propagation vector can be computed by the Poynting vector, which describes the energy flux of the wavefield, and is written by:

$$M_i = -\tau_{ij} v_j \; (i, j \in \{x, z\}) \quad (2)$$

In equation (2) M indicates an $i^{th}$ component of the Poynting vector and $\tau$ and $v$ are the stress tensor and particle velocity, respectively. The computed Poynting vectors are descriptive of an energy flux of the wavefield from which the longitudinal and transverse particle velocity components are extracted. For example, the Poynting vector may be written as:

$$M(x, t) = (M_x(x, t), M_z(x, t)) \quad (3)$$

As mentioned earlier, the direction of particle motion vectors of a P-wave is parallel to the wave propagation direction, whereas the direction of particle motion vectors of an S-wave is perpendicular to the wave propagation direction. As explained later, these properties of the motion and propagation vectors for P- and S-waves provide the basis for the improved separation methodology described in this document.

As mentioned earlier, vector computation logic 166 specifies computing instructions associated with a Poynting vector theory and equation (2). The computing instructions are employed to obtain a direction of wave propagation, which corresponds to the propagation vector. For example, the wavefield separation engine 156 uses vector computation logic 166 to compute propagation vectors (mx, mz) for the wavefield represented by the seismic data based on Poynting vectors of the wavefield that are computed along the horizontal and vertical directions. Likewise, the wavefield separation engine 156 can identify the wave motion vector (vx, vz) that are observable in the wavefield based on energy flow characteristics of the wavefield represented by the seismic data. Computing device 150 then uses the relationship between the propagation and motion vectors of the wavefield to separate P- and S-wave modes of seismic data from the wavefield.

Referring again to process 250, the computing device 150 uses vector computation logic 166 to generate Poynting vectors (262) based on input data that includes the particle velocity components and the stress fields obtained for the wavefield. In some implementations, the computing device 150 generates the Poynting vectors using equation (2) introduced earlier, which may be specified by computation logic 166. For example, the computing logic 166 is used to generate the Poynting vectors of the wavefield based on a first-order elastic wavefield equation that uses the longitudinal or transverse particle velocity components as a first input variable and the P-wave or S-wave mode stress components as a second input variable. As described earlier, the outputs of the first-order elastic wave equations are stress components and particle velocity components of the wavefield. By using these respective components the computing device 150 generates the Poynting vectors as computed solutions to equation (2).

The computing device 150 performs an angle computation (264) to compute or estimate an angle between the propagation vectors for the wavefield and the wave motion vectors observed in the wavefield. The angle computation performed by the computing device 150 includes solving a least-squares problem to obtain a local angle between the wave motion and propagation vectors. For example, performing the angle computation includes generating a least-squares solution for a given time window and estimating the angle in response to generating the least-squares solution.

The computing device 150 applies an angle-based weighting function (266) to separate P- and S-wavefields from the multi-component wavefield obtained using the geophone-receivers. In some implementations, to separate the P- and S-wavefields a specific filter based on the angle between wave motion and propagation vectors is required. Because the wave motion and propagation vectors of P-wavefields are parallel the P-wavefield can be obtained from the original multi-component wavefields when the angle between the propagation and wave motion vectors are 0° or 180° or substantially 0° or 180°. In addition, the propagation and motion vectors of S-wavefields are substantially perpendicular and, thus, can be computed by a remnant of the angle range present after the P-wavefield is separated. The angle θ between both the motion and propagation vectors is estimated by:

$$\theta(x, t) = \cos^{-1}\left(\frac{M \cdot V}{|M||V|}\right) \quad (4)$$

In some implementations, this local angle estimation produces noisy and unstable results due to the complexity of the vector wavefields particularly when the denominator of equation (4) is small. Thus, to improve stability of the angle estimation, a least-squares solution is generated and applied to the expression indicated at equation (4). In view of this, equation (4) can be re-written as:

$$A(x, t) \cos \theta = B(x, t) \quad (5)$$

For example, based on equation (4) the local angle could be directly obtained as an analytic solution. However, this analytic solution for estimating the locale angle will likely yield unstable results due to the complexity of the vector wavefields. So, in some examples equations (5) and (6) are used to obtain a numerical solution that represents a smoother and more stable least squares solution.

In equation (5), $A(x, t)=|M||V|$ and $B(x, t)=M \cdot v$. For a given time window m the computing device 150 can estimate an optimum value for $\cos \theta$ that minimizes the following expression:

$$\cos\theta = \underset{\cos\theta}{\operatorname{argmin}} \sum_{i=t-m/2}^{i=t+m/2} \|B(x, i) - A(x, i)\cos\theta\|_2^2 \qquad (6)$$

Thus, the angle estimated by the generated least-squares solution of equation (6) is:

$$\theta(x, t) = \cos^{-1} \frac{\sum_{i=t-m/2}^{i=t+m/2} A(xi)B(xi)}{\sum_{i=t-m/2}^{i=t+m/2} A(xi)A(x, i)} \qquad (7)$$

In some cases, when generating a least squares solution an example time window m of equation (7) may be a few milliseconds. This example time window can correspond to several time samples. In other cases, various other time windows may be used, such as a time window m that is greater than a few milliseconds or less than a few milliseconds.

The computing device 150 generates the separated P- and S-wavefield components (268) based on the applied angle-based weighting function. In some implementations, for an example 2D assumption the computer systems 124 describer earlier may generate four outputs: i) P-wave modes of seismic data from the longitudinal component data; ii) S-wave modes of seismic data from the longitudinal component data; iii) P-wave modes of seismic data from the transverse component data; and iv) S-wave modes of seismic data from the transverse component data. As explained earlier, the longitudinal (vertical) component data is dominated by the P-wavemodes (with the S-wavemode being noise), whereas the transverse (horizontal) component data is dominated by the S-wavemodes (with the P-wavemode being noise). Hence, the separated or extracted P-wavefield components from the longitudinal geophone represent the P-wavefield of an entire observation and the separated or extracted S-wavefield components from the transverse geophone represent the S-wavefield of the entire observation.

Figure 4:
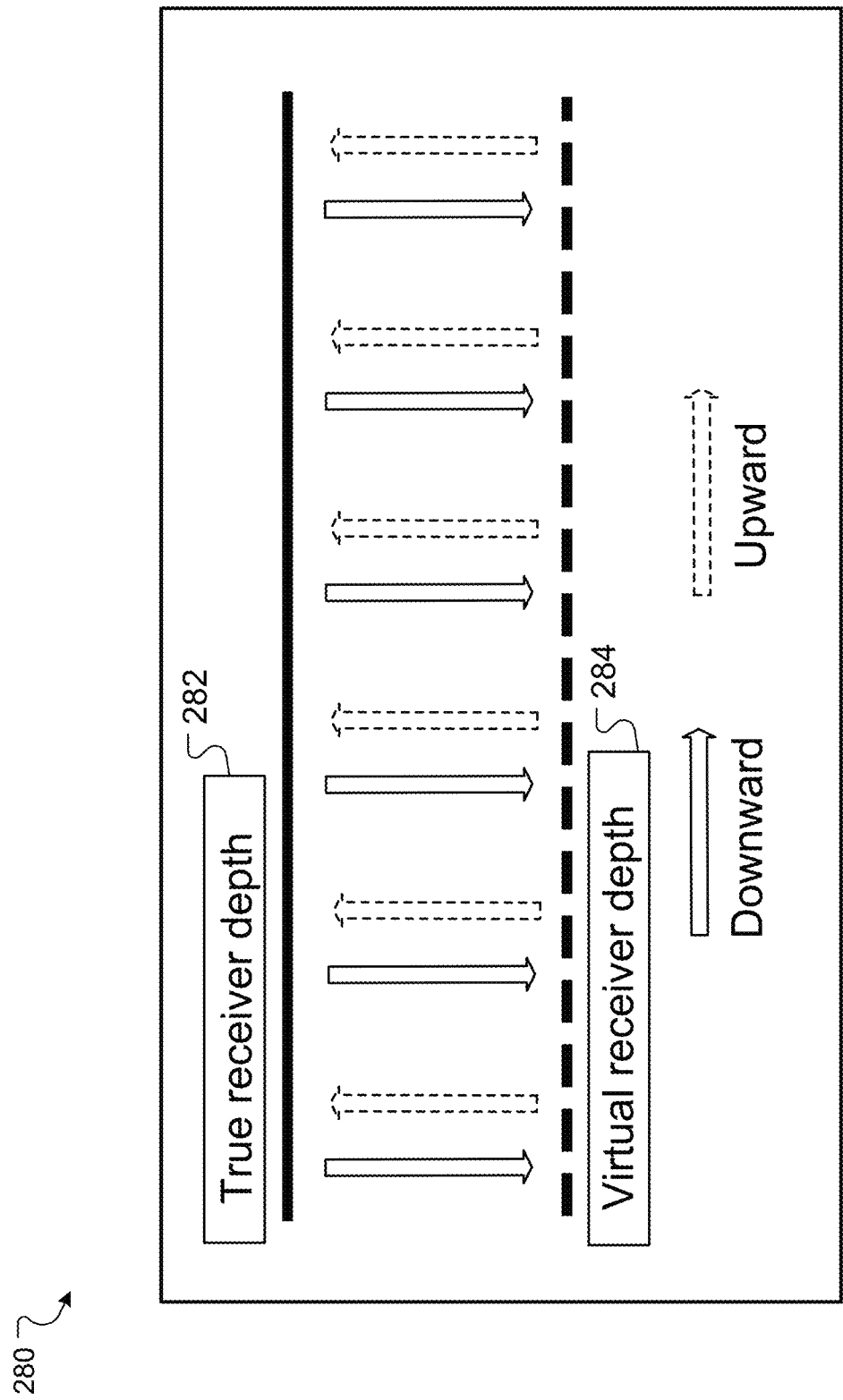
FIG. 4 is a schematic diagram of downward and upward multi-component wavefield extrapolation.

FIG. 4 illustrates a schematic diagram 280 of downward and upward multi-component wavefield extrapolation. In some implementations, the improved wavefield separation process described in this document is performed in the data domain where the seismic multi-component observations represent particle velocity or acceleration. The stress components required to accomplish the P- and S-wave separation are calculated by employing a wavefield extrapolation methodology using the first-order elastic wave equation. In some implementations, downward multi-component wavefield extrapolation provides time reversal virtual wavefields at virtual geophone-receivers 284 that may be located at a certain depth level of subterranean region.

Upward wavefield extrapolation of the virtual wavefields is then used to reconstruct the multi-component wavefields at a true receiver depth level 282. For example, the true receiver depth level corresponds to the true (rather than virtual) depth or location of physical geophone-receivers that may be located at or below a surface area of the subterranean region. After upward extrapolation of a multi-component wavefield the stress field components are reconstructed at the true receiver location and the Poynting vector is estimated for both the longitudinal and transverse component axis by using equation (2).

FIGS. 5A-5F illustrate example wavefield characteristics in seismic data for a subterranean region. In particular, FIGS. 5A-5F show wavefield snapshots for the horizontal and vertical components, their corresponding Poynting vectors, and their wave motion and propagation vectors. Image 302 of FIG. 5A shows horizontal particle velocity components of seismic data obtained from a geophone-receiver. Image 304 of FIG. 5C shows vertical particle velocity components of the seismic data. Image 306 of FIG. 5E shows the corresponding motion vectors. Image 308 of FIG. 5B shows the horizontal component of the Poynting vectors of seismic data obtained from a geophone-receiver. Image 310 of FIG. 5D shows the vertical component of the Poynting vectors of the seismic data. Image 312 of FIG. 5F shows the corresponding propagation vectors. The depictions for the horizontal component of FIG. 5B correspond to the mx parameter of equation (3) described earlier, whereas the depictions for the vertical component of FIG. 5D correspond to the mz parameter of equation (3).

In some implementations, equations (1) and (2), and their respective application in the elastic wavefield separation methodology, can be verified based on observations indicated at FIGS. 5A-5F. For example, motion and propagation vectors are computed for a total wavefield. For these vectors it is observed from FIGS. 5A-5F that when the motion vectors are parallel (or substantially parallel) to the propagation vectors this relationship corresponds to the P-wavefield components, whereas when the motion vectors are perpendicular (or substantially perpendicular) to the propagation vectors this corresponds to the S-wavefield components.

For example, FIG. 5A corresponds to the vx parameter (motion vector) of equation (1), whereas FIG. 5C corresponds to the vz parameter (motion vector) of equation (1). Thus, the depictions of FIG. 5E correspond to equation (1). Similarly, as described earlier, FIG. 5B corresponds to the mx parameter (propagation vector) of equation (3), whereas FIG. 5D corresponds to the mz parameter (propagation vector) of equation (3). Thus, the depictions of FIG. 5F correspond to equation (3).

Figure 6B:
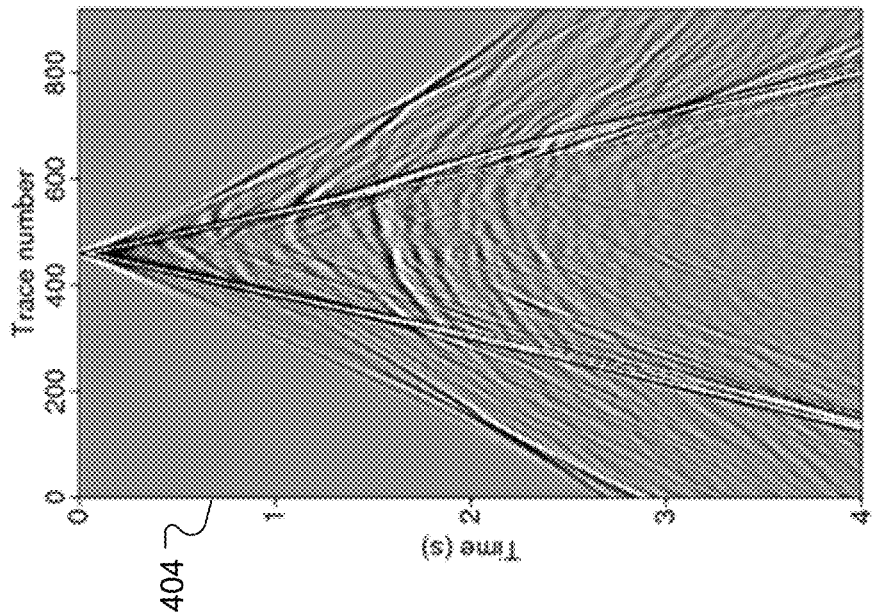
Figure 6A:
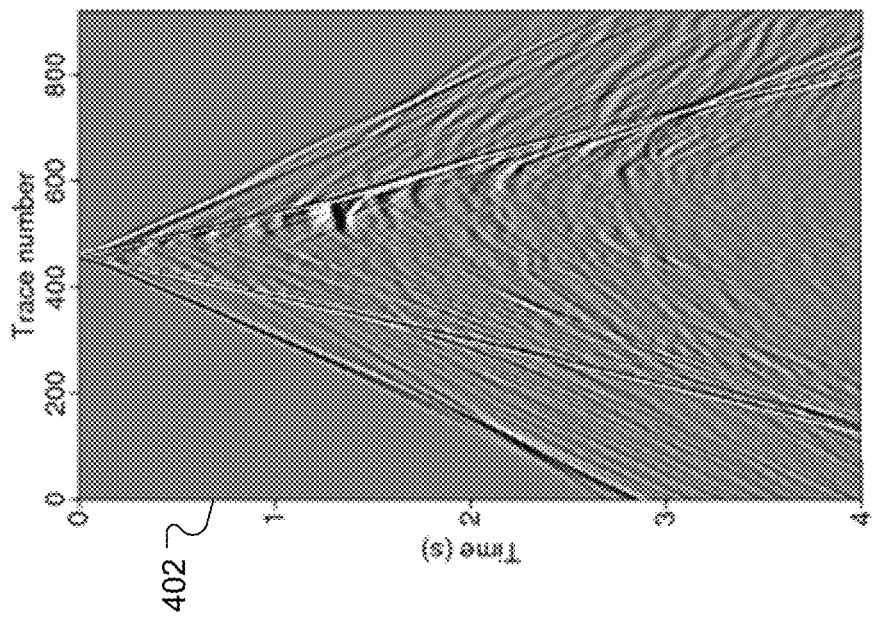
Figure 6D:
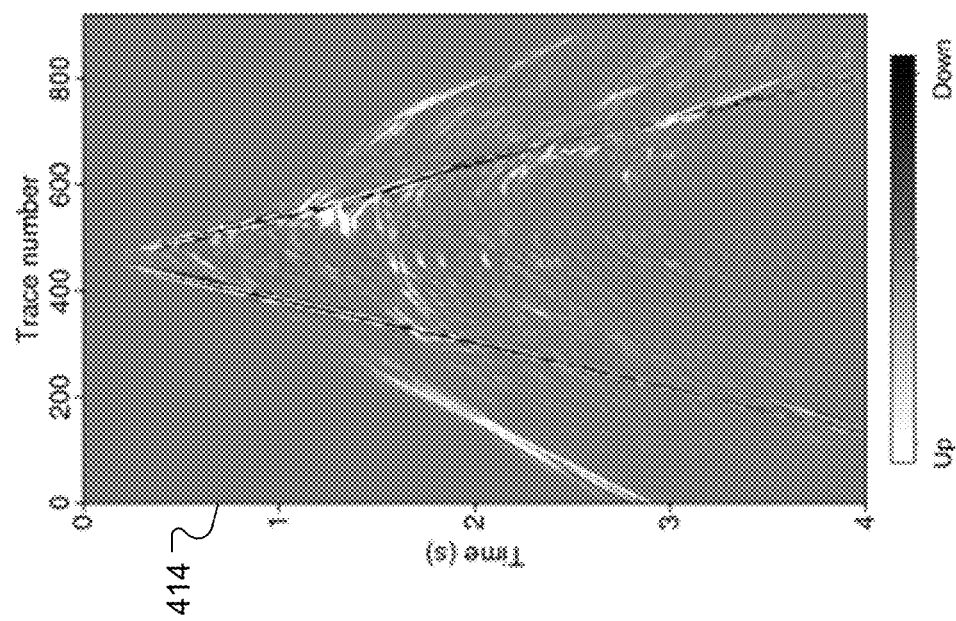
Figure 6C:
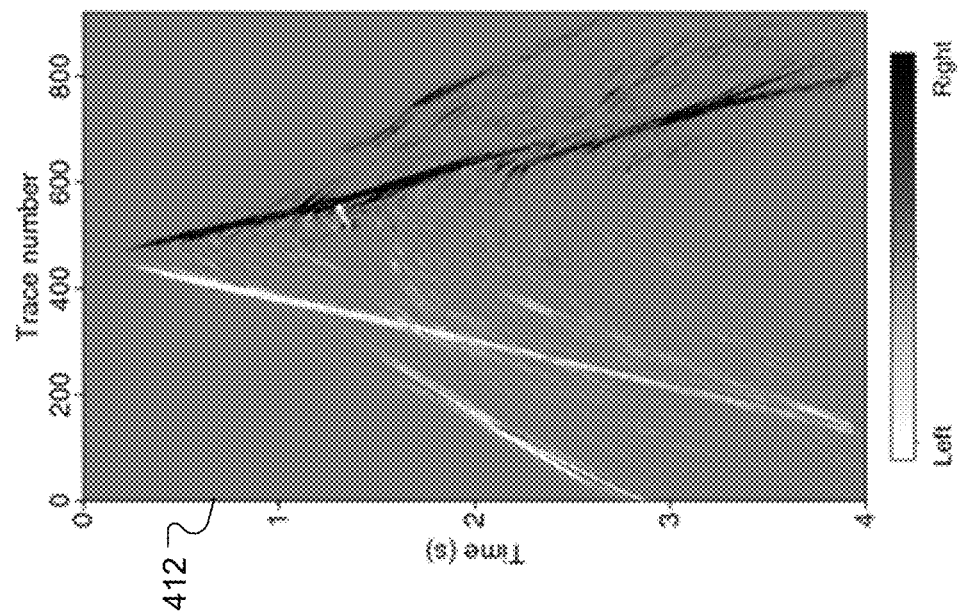

FIGS. 6A-6J illustrate various elements that represent wavefield characteristics in seismic data for a subterranean region. FIGS. 6A and 6B show synthetic input data that represents each element of a wave motion vector. For example, information indicated at image 402 of FIG. 6A is used as input data for the horizontal geophone component and information indicated at image 404 of FIG. 6B is used as input data for the vertical geophone component. Each component represents an element of the wave motion vector. FIGS. 6C and 6D show snapshots corresponding to Poynting vectors that are obtained by multi-component wavefield extrapolation. The wave propagation vectors described earlier are obtained by the Poynting vectors indicated at image 412 of FIG. 6C along the horizontal direction and at image 414 of FIG. 6D along the vertical direction.

Figure 6F:
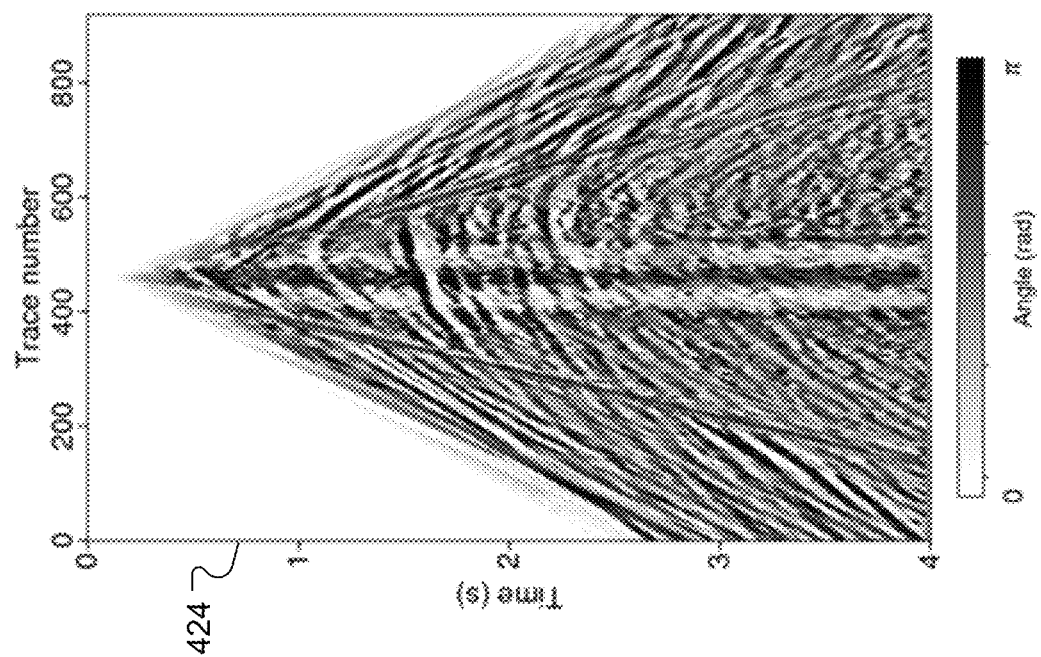
Figure 6E:
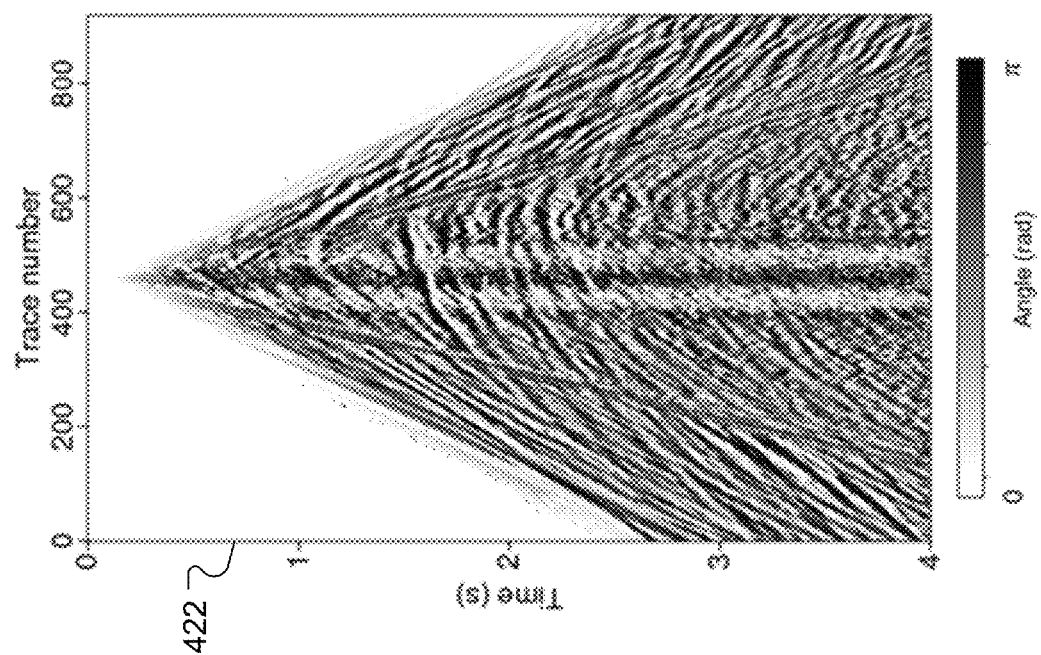
Figure 6J:
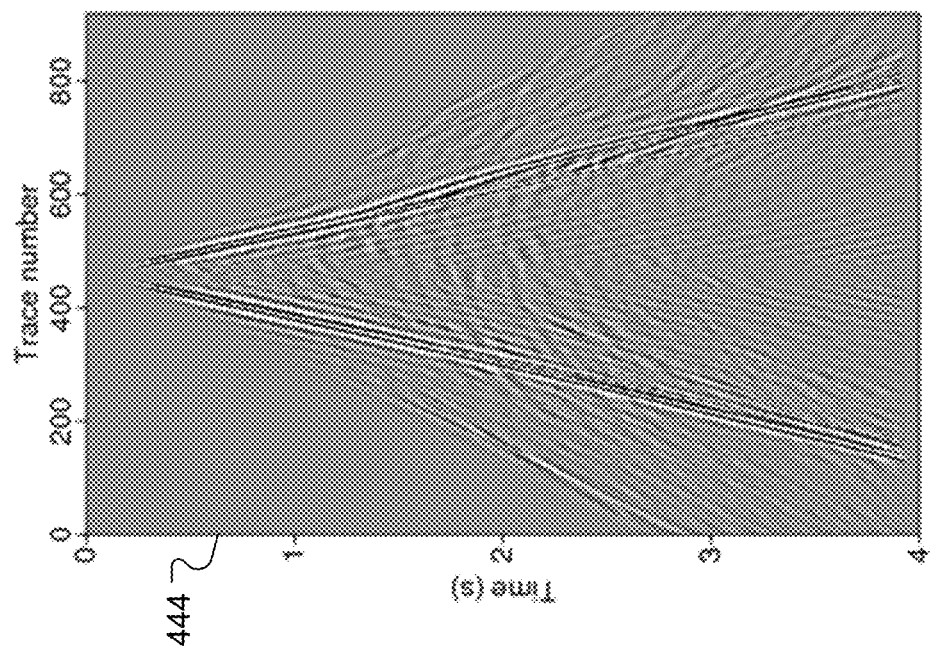
Figure 6I:
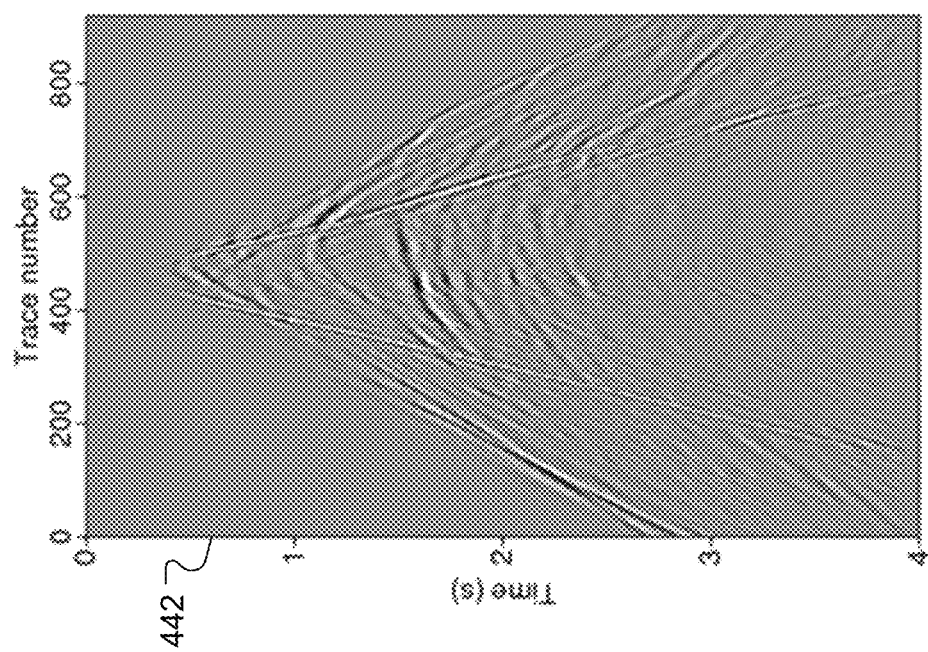

FIGS. 6E and 6F show snapshots of local angles between wave motion and propagation vectors. For example, image 422 of FIG. 6E shows local angles between wave motion and propagation vectors that are obtained by direct solution and image 424 of FIG. 6F shows local angles between wave motion and propagation vectors that are obtained using the generated least-squares solution described earlier. FIGS.

6G-6J show snapshots of elastic wavefield separation results. For example, image 432 of FIG. 6G indicates P-wavefields in the horizontal geophone component and image 434 of FIG. 6H indicates S-wavefields in the horizontal geophone component. Similarly, image 442 of FIG. 6I indicates P-wavefields in the vertical geophone component and image 444 of FIG. 6j indicates S-wavefields in the vertical geophone component.

Figure 7:
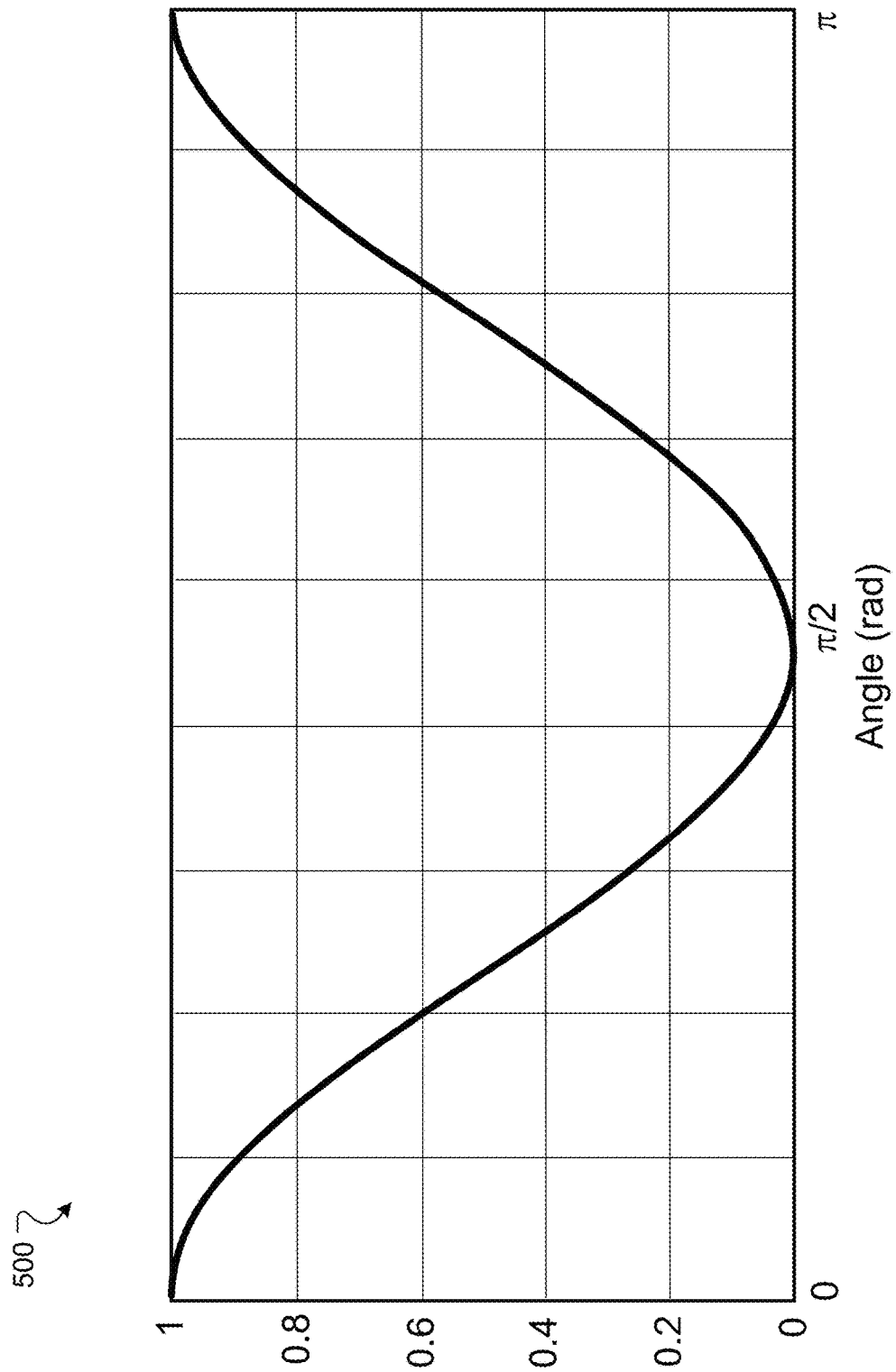
FIG. 7 illustrates an example weighting function based on an angle between a wave motion vector and a propagation vector of a multi-component wavefield.

FIG. 7 illustrates a graphical representation 500 of an example weighting function that is based on an angle between a wave motion vector and a propagation vector of a multi-component wavefield. For vertically generated seismic sources and vertically emerging waves at the geophone-receivers it is expected that the vertical geophone/accelerometer has a relatively greater signal-to-noise ratio (SNR). This greater SNR corresponds to mainly P-wavefield components of a multi-component wavefield. Thus, in terms of processing workflow, the P-wavefields are extracted first from the original multi-component wavefields by using the angle-based weighting function as shown in FIG. 7 and based on the following equations:

$$V_p(x, t) = (V_{xp}(x, t), V_{zp}(x, t)) = (w(\theta(x, t)) V_x(x, t), w(\theta(x, t)) V_z(x, t)) \quad (8)$$

where $$w(\theta(x, t)) = 1/2(1 + \cos(2\theta(x, t))) \quad (9)$$

Then, the S-wavefield components are obtained by subtracting the P-wavefield components from the original multi-component wavefield:

$$v_s(x, t) = v(x, t) - v_p(x, t) = (v_{xs}(x, t), v_{zs}(x, t)) \quad (10)$$

Figure 8:
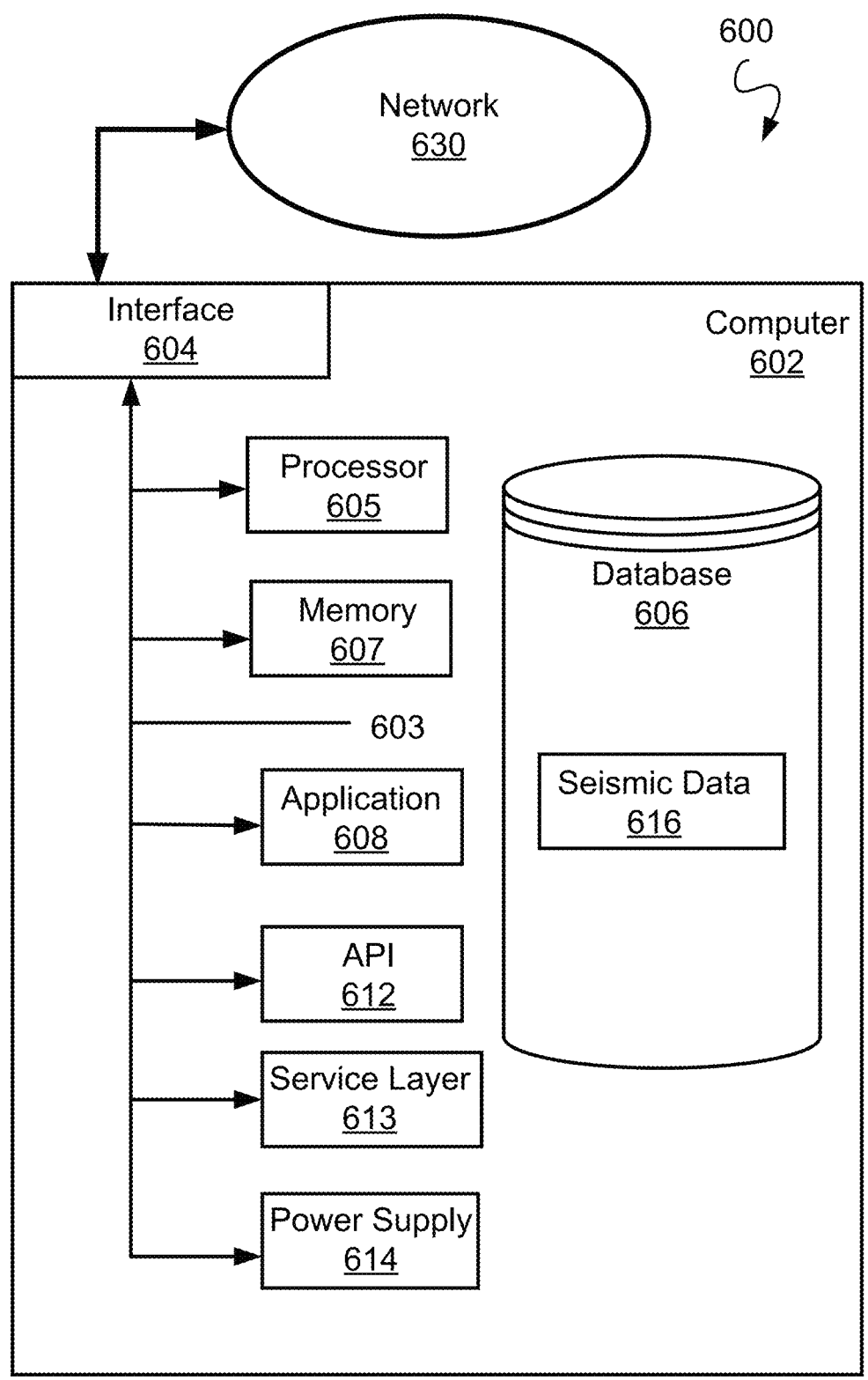
FIG. 8 is a block diagram illustrating an example computer system used to provide computational functionalities associated with described algorithms, methods, functions, processes, flows, and procedures according to some implementations of the present disclosure.

FIG. 8 is a block diagram of an example computer system 600 used to provide computational functionalities associated with described algorithms, methods, functions, processes, flows, and procedures described in the present disclosure, according to some implementations of the present disclosure.

The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

Generally, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 8, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 8, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data, including seismic data 616 (for example, seismic data described earlier at least with reference to FIG. 1), for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 8, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 8, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for identifying primary-wave (P-wave) and secondary-wave (S-wave) characteristics of an underground formation by separating P-wave and S-wave modes of seismic data generated by applying a seismic source to a subterranean region of a geological area, the method comprising:
   obtaining a wavefield comprising longitudinal and transverse particle velocity components observed by geophones deployed in the subterranean region;
   calculating stress components for each of the P-wave and the S-wave modes of seismic data associated with the subterranean region using a wavefield extrapolation engine;
   computing propagation vectors for the wavefield based on the longitudinal and transverse particle velocity components and the stress components for each of the P-wave and the S-wave modes of seismic data using the wavefield extrapolation engine,
   wherein computing the propagation vectors comprises computing Poynting vectors of the wavefield based on a first-order elastic wavefield equation that uses the longitudinal or transverse particle velocity components as a first input variable and the P-wave or S-wave mode stress components as a second input variable;
   estimating an angle between the computed propagation vectors for the wavefield and wave motion vectors observed in the wavefield;
   extracting P-wave components of the wavefield based at least in part on the angle between the propagation vectors and the wave motion vectors using a wavefield separation engine; and
   extracting S-wave components of the wavefield based at least in part on the angle between the propagation vectors and the wave motion vectors using the wavefield separation engine.

2. The method of claim 1, wherein obtaining the wavefield comprising longitudinal and transverse particle velocity components comprises:
   applying the seismic source to the subterranean region and detecting a seismic wave that occurs in response to the seismic source being applied to the subterranean region.

3. The method of claim 2, wherein detecting the seismic wave comprises measuring longitudinal and transverse particle velocity components using one or more geophones in the subterranean region.

4. The method of claim 1, further comprising:
   extracting the longitudinal and transverse particle velocity components of the wavefield from information in the seismic data that corresponds to a measured energy flux of the wavefield.

5. The method of claim 1, wherein calculating stress components for each of the P-wave and the S-wave modes of seismic data comprises:
   calculating the stress components using wavefield extrapolation such that the stress components are calculated without direct manipulation of the wavefield.

6. The method of claim 1, wherein estimating the angle between the computed propagation vectors for the wavefield and wave motion vectors observed in the wavefield comprises:
   estimating the angle in response to generating a least-squares solution for a given time window.

7. The method of claim 6, wherein extracting the P-wave components of the wavefield comprises:
   extracting the P-wave components of the wavefield using an angle-based weighting function that is applied to the angle between the computed propagation vectors for the wavefield and wave motion vectors observed in the wavefield.

8. The method of claim 1, wherein extracting the S-wave components of the wavefield comprises:
extracting the S-wave components of the wavefield in response to subtracting the P-wave components of the wavefield.

9. A system for identifying primary-wave (P-wave) and secondary-wave (S-wave) characteristics of an underground formation by separating P-wave and S-wave modes of seismic data generated by applying a seismic source to a subterranean region of a geological area, the system comprising:
a processor; and
a non-transitory machine-readable storage device storing instructions that are executable by the processor to cause performance of operations comprising:
obtaining a wavefield comprising longitudinal and transverse particle velocity components observed by geophones deployed in the subterranean region;
calculating stress components for each of the P-wave and the S-wave modes of seismic data associated with the subterranean region using a wavefield extrapolation engine;
computing propagation vectors for the wavefield based on the longitudinal and transverse particle velocity components and the stress components for each of the P-wave and the S-wave modes of seismic data using the wavefield extrapolation engine,
wherein computing the propagation vectors comprises computing Poynting vectors of the wavefield based on a first-order elastic wavefield equation that uses the longitudinal or transverse particle velocity components as a first input variable and the P-wave or S-wave mode stress components as a second input variable;
estimating an angle between the computed propagation vectors for the wavefield and wave motion vectors observed in the wavefield;
extracting P-wave components of the wavefield based at least in part on the angle between the propagation vectors and the wave motion vectors using a wavefield separation engine; and
extracting S-wave components of the wavefield based at least in part on the angle between the propagation vectors and the wave motion vectors using the wavefield separation engine.

10. The system of claim 9, wherein obtaining the wavefield comprising longitudinal and transverse particle velocity components comprises:
applying the seismic source to the subterranean region and detecting a seismic wave that occurs in response to the seismic source being applied to the subterranean region.

11. The system of claim 10, wherein detecting the seismic wave comprises measuring longitudinal and transverse particle velocity components using one or more geophones in the subterranean region.

12. The system of claim 9, wherein the operations further comprise:
extracting the longitudinal and transverse particle velocity components of the wavefield from information in the seismic data that corresponds to a measured energy flux of the wavefield.

13. The system of claim 9, wherein calculating stress components for each of the P-wave and the S-wave modes of seismic data comprises:
calculating the stress components using wavefield extrapolation such that the stress components are calculated without direct manipulation of the wavefield.

14. The method of claim 1, wherein computing propagation vectors for the wavefield comprises:
computing propagation vectors for the P-wave mode of seismic data based on Poynting vectors of the wavefield that are computed for the P-wave mode; and
computing propagation vectors for the S-wave mode of seismic data based on Poynting vectors of the wavefield that are computed for the S-wave mode.

15. The method of claim 1, wherein the computed Poynting vectors are descriptive of an energy flux of the wavefield from which the longitudinal and transverse particle velocity components are extracted.

16. The system of claim 9, wherein estimating the angle between the computed propagation vectors for the wavefield and wave motion vectors observed in the wavefield comprises:
estimating the angle in response to generating a least-squares solution for a given time window.

17. The system of claim 16, wherein extracting the P-wave components of the wavefield comprises:
extracting the P-wave components of the wavefield using an angle-based weighting function that is applied to the angle between the computed propagation vectors for the wavefield and wave motion vectors observed in the wavefield.

18. The system of claim 9, wherein extracting the S-wave components of the wavefield comprises:
extracting the S-wave components of the wavefield in response to subtracting the P-wave components of the wavefield.

19. The system of claim 9, wherein computing propagation vectors for the wavefield comprises:
computing propagation vectors for the P-wave mode of seismic data based on Poynting vectors of the wavefield that are computed for the P-wave mode; and
computing propagation vectors for the S-wave mode of seismic data based on Poynting vectors of the wavefield that are computed for the S-wave mode.

20. The system of claim 9, wherein the computed Poynting vectors are descriptive of an energy flux of the wavefield from which the longitudinal and transverse particle velocity components are extracted.

21. A non-transitory machine-readable storage device storing instructions that are executable by a processor to cause performance of operations comprising:
obtaining a wavefield comprising longitudinal and transverse particle velocity components observed by geophones deployed in a subterranean region;
calculating stress components for each of a P-wave mode and an S-wave mode of seismic data associated with the subterranean region using a wavefield extrapolation engine;
computing propagation vectors for the wavefield based on the longitudinal and transverse particle velocity components and the stress components for each of the P-wave and the S-wave modes of seismic data using the wavefield extrapolation engine,
wherein computing the propagation vectors comprises computing Poynting vectors of the wavefield based on a first-order elastic wavefield equation that uses the longitudinal or transverse particle velocity components as a first input variable and the P-wave or S-wave mode stress components as a second input variable;

estimating an angle between the computed propagation vectors for the wavefield and wave motion vectors observed in the wavefield;

extracting P-wave components of the wavefield based at least in part on the angle between the propagation vectors and the wave motion vectors using a wavefield separation engine; and extracting S-wave components of the wavefield based at least in part on the angle between the propagation vectors and the wave motion vectors using the wavefield separation engine.

\* \* \* \* \*